(12) United States Patent
Ezequiel

(10) Patent No.: US 10,958,976 B2
(45) Date of Patent: Mar. 23, 2021

(54) METHOD FOR SELECTING AND DISPLAYING TELEVISION PROGRAMS TRANSMITTED THROUGH AN INTERNET NETWORK, AND RELATED APPARATUS AND SYSTEM

(71) Applicant: SARONIKOS TRADING AND SERVICES, UNIPESSOAL LDA, Madeira (PT)

(72) Inventor: Ruiz Rodriguez Ezequiel, Panama (PA)

(73) Assignee: Saronikos Trading and Services, Unipessoal LDA, Madeira (PT)

( * ) Notice: Subject to any disclaimer, the term of this patent is extended or adjusted under 35 U.S.C. 154(b) by 0 days.

(21) Appl. No.: 14/770,068

(22) PCT Filed: Feb. 25, 2013

(86) PCT No.: PCT/EP2013/053718
§ 371 (c)(1),
(2) Date: Aug. 24, 2015

(87) PCT Pub. No.: WO2014/127843
PCT Pub. Date: Aug. 28, 2014

(65) Prior Publication Data
US 2016/0007086 A1 Jan. 7, 2016

(51) Int. Cl.
*H04N 21/462* (2011.01)
*H04H 20/20* (2008.01)
(Continued)

(52) U.S. Cl.
CPC ........ *H04N 21/4622* (2013.01); *H04H 20/20* (2013.01); *H04H 20/93* (2013.01);
(Continued)

(58) Field of Classification Search
CPC ............. H04N 21/4622; H04N 21/482; H04N 21/4828; H04N 21/6125; H04N 21/8586;
(Continued)

(56) References Cited

U.S. PATENT DOCUMENTS

2006/0013487 A1* 1/2006 Longe ................... G06F 17/273
382/229
2006/0218580 A1* 9/2006 Bushnell .............. H04N 21/235
725/37
(Continued)

FOREIGN PATENT DOCUMENTS

| CN | 101132497 A | 2/2008 |
| CN | 101159848 A | 4/2008 |

(Continued)

OTHER PUBLICATIONS

International Search Report for Application No. PCT/EP2013/053718 dated Mar. 28, 2013.
(Continued)

*Primary Examiner* — Joshua D Taylor
(74) *Attorney, Agent, or Firm* — Workman Nydegger

(57) ABSTRACT

A method is described for selecting and displaying, on or through a television signal receiver apparatus capable of connecting to Internet and of pointing to URL's, television programs transmitted through an Internet network, said method comprises the step of associating at least one URL, or Uniform Resource Locator, corresponding to streaming audio/video of a specific television program, with the same television program of an EPG, or Electronic Program Guide, received by said apparatus via television broadcast, and wherein said association requires that said URL be stored into a memory-type processing circuit of the apparatus to create a link between said specific television program received through said Internet network and the same specific (Continued)

television program of said EPG received by said television receiver apparatus via television broadcast.

18 Claims, 4 Drawing Sheets

(51) Int. Cl.
H04H 20/93 (2008.01)
H04H 60/72 (2008.01)
H04N 21/433 (2011.01)
H04N 21/44 (2011.01)
H04N 21/482 (2011.01)
H04N 21/61 (2011.01)
H04N 21/858 (2011.01)
H04H 60/39 (2008.01)

(52) U.S. Cl.
CPC ........ *H04H 60/72* (2013.01); *H04N 21/4332* (2013.01); *H04N 21/44008* (2013.01); *H04N 21/482* (2013.01); *H04N 21/4828* (2013.01); *H04N 21/6125* (2013.01); *H04N 21/8586* (2013.01); *H04H 60/39* (2013.01)

(58) Field of Classification Search
CPC ........ H04H 20/20; H04H 20/93; H04H 60/72; H04H 60/39
See application file for complete search history.

(56) References Cited

U.S. PATENT DOCUMENTS

| | | | |
|---|---|---|---|
| 2008/0052614 A1 | 2/2008 | Urabe et al. | |
| 2009/0019484 A1* | 1/2009 | Jo | H04H 20/26 725/40 |
| 2009/0279847 A1* | 11/2009 | Kinoshita | H04N 5/44543 386/291 |
| 2010/0203823 A1* | 8/2010 | Apaar | H04H 20/20 455/3.06 |
| 2013/0081098 A1* | 3/2013 | Klughart | H04N 5/76 725/153 |
| 2014/0130092 A1* | 5/2014 | Kunisetty | H04N 21/4821 725/40 |

FOREIGN PATENT DOCUMENTS

| | | |
|---|---|---|
| EP | 1 841 104 | 10/2007 |
| EP | 1 841 104 A1 | 10/2007 |
| EP | 2 015 482 | 1/2009 |
| EP | 2 114 070 | 11/2009 |

OTHER PUBLICATIONS

Chinese Office Action dated May 3, 2017, issued in Chinese Application No. 201380073782.5.
Chinese Office Action dated Nov. 13, 2017, issued in Chinese Application No. 201380073782.5.

* cited by examiner

17

| | 09.00 | 09.30 | 10.00 | 10.30 |
|---|---|---|---|---|
| Network #1 | Progr. #1 http://www... | Progr. #2 | Progr. #3 | Progr. #4 |
| Network #2 | Progr. #5 | Progr. #6 | Progr. #7 | Progr. #8 |
| Network #3 | Progr. #9 | Progr. #10 | Progr. #11 | Progr. #12 |
| Network #4 | Progr. #13 | Progr. #14 | Progr. #15 | Progr. #16 |

EPG 19  21

December 18 Tuesday, 2012 – 10.05

Fig. 2a

EPG

|  | 09.00 | 09.30 | 10.00 | 10.30 |
|---|---|---|---|---|
| Network #1 | Progr. #1 | Progr. #2 | Progr. #3 | Progr. #4 |
| Network #2 | Progr. #5 | Progr. #6 | Progr. #7 | Progr. #8 |
| Network #3 | Progr. #9 | Progr. #10 | Progr. #11 | Progr. #12 |
| Network #4 | Progr. #13 | Progr. #14 | Progr. #15 | Progr. #16 |

URL of Progr. #1
1. http://www.....
2. http://www.....
.
.
N. http://www.....

December 18 Tuesday, 2012 – 10.05

Fig. 2b

| Network | Program | Start Time | End Time | URL |
|---|---|---|---|---|
| ZDF | Morgen Magazine | 13.30 | 14.00 | http://www.zdf.de/ZDFmediathek#/beitrag/einzelsendung/1802458/Morgenmagazin-vom-27-Dezember-2012 |
| ZDF | Superbauten 2 | 23.10 | 01.00 | http://www.zdf.de/ZDFmediathek#/beitrag/video/1788702/Superbauten-2:-S%C3%A4ulen-f%C3%BCr-die-Ewigkeit |
| ARD | Stimmen zum Spiel Hannover - Leverkusen | 12.00 | 12.10 | http://www.ardmediathek.de/wdr-fernsehen/bundesliga-am-sonntag/stimmen-zum-spiel-hannover-leverkusen-3-2?documentId=12742208 |

Fig. 3

METHOD FOR SELECTING AND DISPLAYING TELEVISION PROGRAMS TRANSMITTED THROUGH AN INTERNET NETWORK, AND RELATED APPARATUS AND SYSTEM

The present application claims priority from PCT Patent Application No. PCT/EP2013/053718 filed on Feb. 25, 2013, the disclosure of which is incorporated herein by reference in its entirety.

FIELD OF THE INVENTION

The present invention relates to a method for selecting and displaying, on or through a television signal receiver apparatus capable of connecting to Internet, television programs transmitted through an Internet network, as well as to the related apparatus and system.

In the following description, it will be apparent that a television signal receiver apparatus is meant to be a television set with a screen, or a satellite or cable or terrestrial set-top box capable of receiving and displaying television programs, in the latter cases by using an external screen of a monitor or a television set. Likewise, a television broadcast is meant to be any broadcasting of television signals via air or cable, e.g. in accordance with the following standards: DVB-T, DVB-C and DVB-S.

It is known that television networks are now duplicating their programs being broadcast via air (e.g. terrestrial or satellite transmissions) or via cable in order to make them available to potential users also through the Internet network.

This latter viewing option is virtually dedicated to computer owners because, in order to view television programs in the so-called streaming mode, it is necessary to use a browser to point to the site of the television network transmitting the desired program and then navigate within said site until the desired program is found. This task is time-consuming and complex, and certainly it is not within the grasp of people who are not familiar with computers and Internet.

Nowadays, almost every television network has its own Internet site where programs can be watched in streaming mode; in Germany, for example, the ARD television network has an Internet site of its own ("http://www.ard.de"), just like the ZDF network ("http://www.zdf.de").

Therefore, if a user wants to know which television programs, whether current or future ones, are being or will be transmitted on the ARD television network, or is searching for a particular program, he/she will have to visit the associated Internet site and navigate therein; if nothing of interest is found, he/she will have to exit the ARD site and go, for example, to the ZDF site, where the entire process will have to be carried out again. Should then the user want to see what is available on the RTL network, he/she will have to repeat the process again. Such a large number of operations can be very annoying for the user.

This time-consuming and complex procedure for searching for a television program transmitted in streaming mode over the Internet network is not "user-friendly" at all, especially when compared to the normal reception of television programs (broadcast via air or cable) by means of a television set or a set-top box.

In fact, through an EPG ("Electronic Program Guide") received by the television receiver along with air or cable television programs, it is possible to explore all the television programs broadcast by a plurality of television networks with just a few moves of a cursor.

Many EPG forms are known in the art, some of which are broadcast by television networks, while others are created in the television receiver apparatus itself, based on information, such as program name, program duration and the like, contained in the television signal being received.

It is apparent from the above that a conventional EPG relating to television programs broadcast by a plurality of television networks is very easy to use when compared with the complexity of having to navigate through a plurality of Internet sites of as many television networks. It is also apparent that the prior art does not allow to easily watch a desired program again via the Internet channel by directly starting from an EPG sent to a television receiver apparatus via air (e.g. by digital terrestrial or satellite broadcasting) or via cable.

Furthermore, the user feels very uncomfortable when, for example, the air or cable broadcasting is not working (as far as air broadcasting is concerned, it is known that, with the advent of the digital terrestrial technology, a television channel often cannot be received due to minimal interferences or bad atmospheric conditions that totally black out the television signal) and he/she wants to watch the program through Internet, but finds out that, to his/her great disappointment, retrieving that specific program can be a very difficult task.

In these cases it is useful to search on the Internet network for the desired program, but search times must be minimized, especially if the user wants to watch the a program in a moment of time, when such program is no longer be broadcast.

SUMMARY OF THE INVENTION

It is therefore one object of the present invention to provide a method, an apparatus and a system for selecting and displaying television programs broadcast through Internet in a "user-friendly" manner.

It is another object of the present invention to provide a method, an apparatus and a system for selecting and displaying television programs broadcast through an Internet network, which allow a user to easily switch the reception of a television program from the air or cable channel to Internet reception.

It is a further object of the present invention to provide a method, an apparatus and a system for selecting and displaying television programs transmitted through an Internet network, which allow a user to easily and quickly search the Internet network for a television program.

These and other objects of the invention are achieved through a method, an apparatus and a system for selecting and displaying, on or through a television signal receiver apparatus capable of connecting to Internet, television programs transmitted through the Internet network, as claimed in the appended claims, which are an integral part of the present description.

In brief, a method is described for selecting and displaying television programs transmitted through an Internet network, said method comprising the step of associating at least one URL (Uniform Resource Locator), corresponding to streaming audio/video of a specific television program, with the same television program of an EPG (Electronic Program Guide), received by said apparatus, wherein said association requires that said URL be stored into a memory of the apparatus to create a link between said specific television program (19) received through the Internet network and the same television program (19) of said EPG received by said television receiver apparatus (1).

Further features of the invention are set out in the appended claims, which are intended to be an integral part of the present description.

The above objects will become more apparent from the following detailed description of a method and a system for selecting and displaying television programs transmitted through the Internet network according to the present invention, with particular reference to the annexed drawings.

BRIEF DESCRIPTION OF THE DRAWINGS

FIGS. 2a and 2b show two examples of EPG's according to the present invention.

FIG. 3 shows one example of an EPG data structure stored in a memory of the television signal receiver apparatus according to the present invention.

DETAILED DESCRIPTION OF EMBODIMENTS

Figure 1:
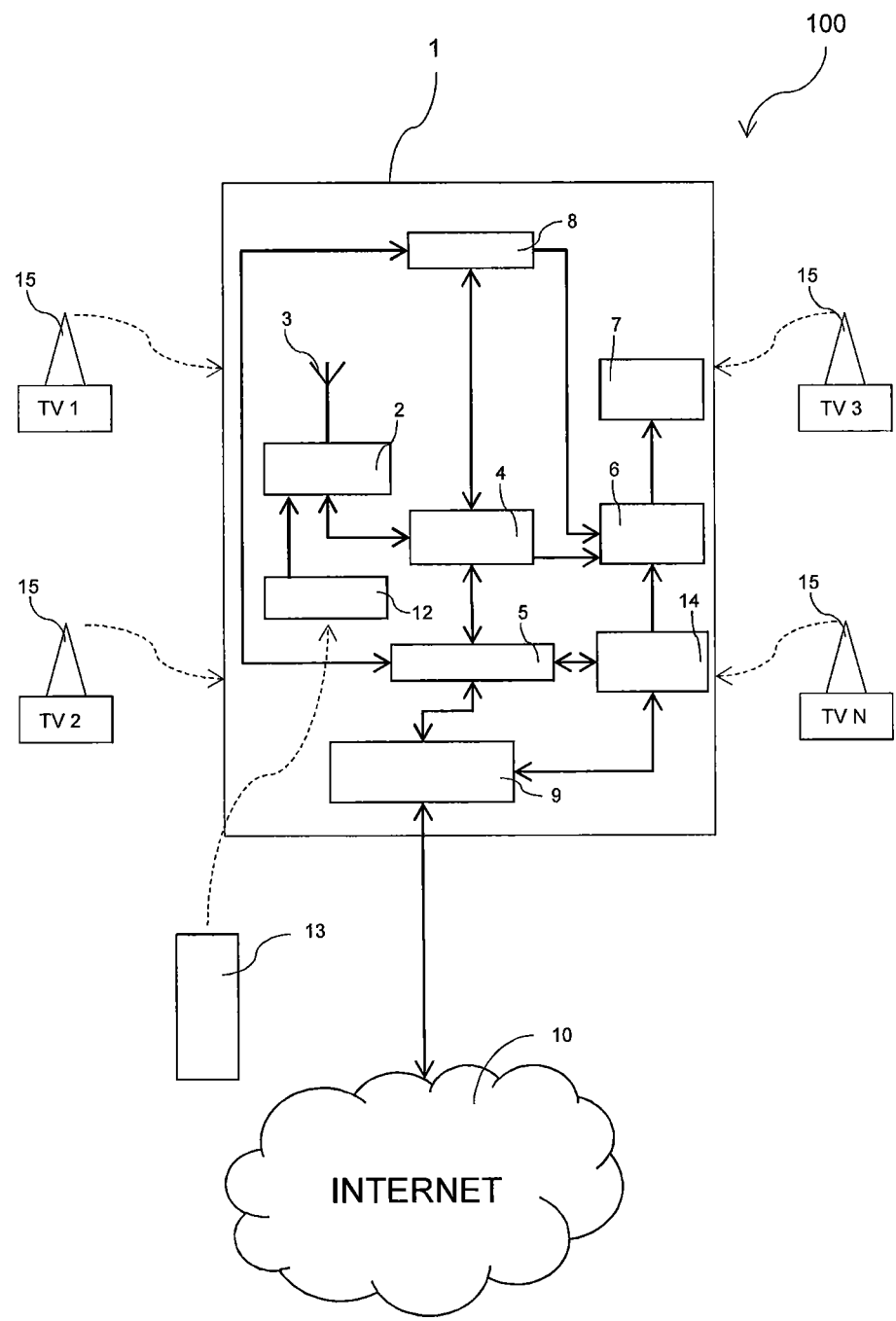
FIG. 1 shows a scenario divided into blocks related to a television signal receiver apparatus according to the present invention.

It is to be understood that the figures and descriptions of the present invention have been simplified to illustrate elements that are relevant for a clear understanding of the present invention, while eliminating, for purposes of clarity, many other elements which are conventional in this art. Those of ordinary skill in the art will recognize that other elements are desirable for implementing the present invention. However, because such elements are well known in the art, and because they do not facilitate a better understanding of the present invention, a discussion of such elements is not provided herein.

The present invention will now be described in detail on the basis of exemplary embodiments.

With reference to FIG. 1, there is shown a preferred embodiment of the invention of a television receiver apparatus 1, in particular a television set, but it may also be a set-top box, comprising a tuning and demodulating unit 2 that receives a normal television signal through an input 3, which may be a terrestrial or satellite antenna (but may also be the coaxial input connector of a cable television network). The tuning and demodulating unit 2 is connected to a video circuit 4 that decodes a television video signal, e.g. with Mpeg2 or Mpeg4 coding, which, under the control of a central processor 5, in particular containing one or more microprocessors, supplies the television video signal to a switching circuit 6 ("switch"), which is then sent to a screen 7 for reproduction, the latter being external to the television signal receiver apparatus 1 if the apparatus 1 is a set-top box.

From the television video signal decoded by the video circuit 4, an Electronic Program Guide (EPG) is extracted which is then sent to a memory-type processing circuit 8, in particular containing a non-volatile read/write memory. Under the control of the central processor 5 (which also controls the operation of the switching circuit 6), the memory-type processing circuit 8 stores the data of the EPG programs received along with the television signals irradiated via air or cable.

The EPG data transmitted within the television signals received at the input 3 of the apparatus 1 are updated over time but, according to the invention, those relating to programs no longer broadcast are also kept in the memory-type processing circuit 8 for a certain period of time, e.g. a week (seven days). Said period of time may be set by the user through a menu of the apparatus 1, or it may be preset by the manufacturer of the apparatus 1 based on the physical size, expressed in bytes, of the memory 8.

The apparatus 1 further comprises at least one network interface 9, e.g. Wi-Fi, Ethernet or the like, which allows the apparatus 1 to connect to an Internet network 10. This functionality is made possible by a "browser" application comprised in the apparatus 1, which is implemented at application level through the central processor 5 and exploits the memory-type processing circuit 8 for storing the Internet navigation data (this functionality is currently available, for example, in the so-called "Smart TV" television sets).

Furthermore, the apparatus 1 comprises a receiver 12, also connected to the tuning and demodulating unit 2, which receives the control signals from a remote control device 13 operated by a user and supplies them to the central processor 5 (via a connection not shown in the drawing for simplicity) for the execution of functions of the apparatus 1, including program tuning.

When an audio/video signal is received in streaming mode from the Internet network 10, said audio/video signal is processed by the central processor 5 and decoded by a web decoder 14, in particular containing a microprocessor, which generates a video signal suitable for being displayed on a screen and then redirects the audio/video signal obtained from the streaming towards the switching circuit 6, from which it arrives at the screen 7. The information useful for video decoding of the streaming signals (e.g. the "codecs" that allow to decode formats such as DivX, Xvid, MPEG-4, H.263, H.264, MPEG1, MPEG2, AVC, FLV1, FLV4 and the like) reside in software applications (e.g. so-called "plug-ins") stored in the memory-type processing circuit 8 and used by the web decoder 14.

A similar process is carried out for the audio signals, i.e. both the one associated with the television signal irradiated via air or cable and the one received in streaming mode; for simplicity, however, it will not be described in detail.

Still with reference to FIG. 1, a block scenario 100 is shown wherein a plurality of television network transmitters 15 ("TV 1", "TV 2", "TV 3" "TV N") duplicate the air or cable irradiated programs to make them available to potential users of the apparatus 1 also through the Internet network 10, and the apparatus 1 is connected to the Internet network 10 through the network interface 9.

With reference to FIGS. 2a and 2b, in a first embodiment of the invention the contents of an EPG 17 broadcast by a plurality of television networks 15 are not those known in the prior art; instead, for each television program 19 the typical EPG data are complemented with an Internet address (URL) 21, or multiple addresses 21, where that television program 19 will be available for a given number of days, e.g. a week (seven days). Here are some examples of such URL's 21 in Germany:

www.zdf.de/ZDFmediathek#/beitrag/video/1706158/
      Blaulicht;
    www.zdf.de/ZDFmediathek#/beitrag/video/1019074/Bo-
      ses-Erwachen;
    www.ardmediathek.de/das-erste/panorama/tod-in-der-
      fabrik-der-preis-fuer-illigekleidung?documen-
      tId=12717100.

In this manner, when the user, for whatever reason, wants to watch a television program 19 on his/her apparatus 1 through the Internet network 10, e.g. because air or cable reception is not good, or because the desired program 19 has already been broadcast and is therefore only available through the media libraries of television networks 15 (which typically make it available to users for another week), it will be sufficient in this case to display the advanced EPG 17 stored in the memory-type processing circuit 8, which shows the currently available television programs 19 as well as old ones stored for a predetermined period of time according to the first in—first out principle. When a key is pressed on the remote control device 13 (or a key on the apparatus 1 itself) for selecting the "Internet reception" mode after having selected a specific program 19 from the advanced EPG 17, the central processor 5 will command the network interface 9 to point, through a browser, to the URL 21 associated with the television program selected from the advanced EPG 17 and, once the command to start the streaming audio/video has been sent to the site of the chosen television network. The signal received through the network interface 9 will be transferred to the web decoder 14, which will then treat it in such a way as to make it suitable for being sent, through the switching circuit 6, to the screen 7. It must be pointed out that the user does not need to know which URL must be pointed to in order to view the desired program through the Internet network, since the advanced EPG 17 includes the data of the URL 21 concerned (for each program), and there is no need to show it to the user, in order to avoid hindering the vision of the advanced EPG 17 itself. The user only needs to be able to select the desired television program 19, since the apparatus will then associate it with the corresponding URL 21 and point to the correct address.

When the user wants to stop watching a television program 19 received through the Internet network 10, or if the program has ended, upon receiving a command issued by the user the apparatus 1 will return into the typical program viewing mode of a known television set.

It is clear that, thanks to this artifice of creating a link between each television program 19 being broadcast and a corresponding URL 21 of the site of the television network (where it can be watched in streaming mode), selecting a current or missed (because already broadcast) program 19 becomes much easier than in the prior art.

Moreover, the URL's 21 may also refer to Internet pages not belonging to the site of the television network 15 broadcasting that specific television program 19. In fact, the EPG data relating to the URL's 21 may concern links to external servers used for storing the contents of the television networks 15.

With reference to FIG. 2b, related to an additional embodiment, if the EPG data contain a plurality of URL's 21, then the EPG 17 will open a superimposed screen 18 (commonly referred to as "pop-up" screen) listing the URL's 21. This pop-up screen 18 opens next to the cell of the program 19 and comprises a visual pointer that points to said cell. The pop-up screen 18 opens in response to a user input through a key of the remote control device 13 or after a certain period of time (e.g. 2 seconds) has elapsed since a user has positioned the cursor on the cell of a television program 19 in the advanced EPG 17.

From this pop-up screen 18, by means of a cursor controlled through the remote control device 13, the user of the apparatus 1 can choose the URL 21 from which to obtain the desired program in streaming mode, and possibly change it in order to obtain better video quality.

It is clear that in the solution example described so far it is necessary that the television networks broadcast via air or cable, along with the irradiated signal, also an advanced EPG like the one shown in FIGS. 2a and 2b. This involves no big changes in a prior-art EPG structure, but allows a user to gain access to the Internet network in a simpler and more flexible way compared to the prior art.

In a second embodiment of the invention, the EPG data transmitted by the plurality of television networks 15 do not contain the URL's 21 of the television programs 19, but only television network names, channel numbers, program names, program times, synopses, and the like. As aforesaid, such EPG data are stored into the memory-type processing circuit 8 by the central processor 5 for a preset period of time, e.g. a week.

A user can therefore navigate within the EPG, with the help of a visual indication, in particular a cursor controlled through the remote control device 13 (in order to highlight a program cell 19), so as to select a desired television program 19 and possibly launch a browser through an input (e.g. a dedicated key) from the remote control device 13 for the purpose of searching the Internet network 10 for the selected television program 19. In particular, when the user wants to launch the browser, he/she presses a key on the remote control device 13 and, upon such action, the central processor 5 reads the name of the program 19 contained in the program cell highlighted by the cursor in the EPG 17. As a result, the central processor 5 opens the browser, requesting an Internet page of a search engine, and places the name of the program 19, the date and the address of the Internet site of the network to be pointed to (e.g. if the program is broadcast by the ZDF television network, then the site will be: http://wwwzdf.de/ZDFmediathek#, or: http://www.ard-mediathek.de if the program is broadcast by ARD) into the search field on that page. This behavior allows a user to make immediate searches through the Internet network 10 for the television program 19. The search may be made by filtering the results in the search engines, e.g. by adding the limitation of selecting "Video-only" contents to the above-mentioned parameters.

Therefore, a user searches for an Internet address 21, in particular a URL 21, which allows him/her to view that specific television program 19 in streaming mode.

Once the user has found the URL 21, corresponding to streaming audio/video of the desired program 19, he/she has the possibility of associating that URL 21 with the name of the searched television program 19 contained in the stored EPG data. This association is made by the central processor 5, which stores the URL 21 into the memory-type processing circuit 8 to create a link between the URL 21 and the name of the program 19 in the stored EPG data, thus originating an advanced EPG 17.

With reference to FIG. 3, there is shown one example of EPG data stored in the memory-type processing circuit 8. According to a possible variant concerning the search for the Internet addresses 21, the search is not carried out manually by the user, but automatically by the apparatus 1. In this mode, while a user is not viewing the EPG 17, in particular while watching a television program or when the apparatus 1 is in stand-by, the central processor 5 reads from the memory-type processing circuit 8 the names of the programs 19 previously stored when tuning the channels and receiving the EPG data (including the stored data relating to the last seven programming days). For each program name 19 present in the memory-type processing circuit 8, excluding those already associated with a previously saved URL 21, the central processor 5 automatically searches (this step is referred to as "background search") for all programs not yet linked to a URL 21, for the corresponding television program 19 transmitted in streaming mode on the Internet network 10. This search is made by using the browser and by setting, for example, the same parameters as those already mentioned for the previous case relating to a manual search, including the search filter specifying "Video-only"

URL's 21. The central processor 5 thus reads the first Internet address 21 obtained from the search results, in particular the URL 21, and stores said URL 21 into the memory-type processing circuit 8 to create a link to the name of the corresponding television program 19 in the stored EPG data, thus originating an advanced EPG 17.

In all cases, it must be noted that it is advantageous to store into the memory-type processing circuit 8 also the name of the network 23 broadcasting the television program 19 and the date. In fact, if the search for the URL 21 is made by using the name of the program 19, the name of the corresponding network 23 and the date, the browser search results will be more accurate; in particular, they will be more specifically related to the Internet site of the television network 15 that provides that specific program 19.

The search through the Internet sites then goes on, one by one, until the EPG received via television broadcast is changed into an advanced EPG 17 that contains, for each program 19, a link to a URL 21 associating the same program 19 available through the Internet network 10.

At this point, the advanced EPG 17 allows to display and use the URL's 21 associated with the television programs 19 (see FIG. 2); most importantly, a user can select a program 19 and open the corresponding URL 21 directly from the advanced EPG 17, in order to watch that program 19 in streaming mode through the Internet network 10, even without seeing the URL address 21 on the screen 7, because a link will have already been created in the memory-type processing circuit 8 between the program 19 available via television broadcast and the same program available through the Internet network 10.

It must be pointed out that the method according to the invention can be implemented through a computer product which can be loaded into a memory of the apparatus 1 and which comprises portions of software code adapted to implement the method by using existing hardware.

A first advantage of the method, apparatus and system according to the present invention is that a user is given the possibility of watching television programs through the Internet network in a "user-friendly" manner.

A second advantage of the method, apparatus and system according to the invention is that a user can easily switch the reception of a television program from the air or cable channel to the Internet channel.

A third advantage of the method, apparatus and system according to the present invention is that a user can watch a television program on the Internet network by directly starting from the EPG received by the apparatus via (air or cable) television broadcast, thus selecting the desired program in a way wholly similar to known EPG's, which only allow selecting programs received via television broadcast.

Another advantage of the method, apparatus and system according to the present invention is that a user is allowed to easily and quickly search for a television program through the Internet network.

A further advantage of the method, apparatus and system according to the present invention is that a user can still watch a favorite program even in the absence of the television signal broadcast via air or cable.

The method, apparatus and system for selecting and displaying, on or through a television signal receiver apparatus capable of connecting to Internet, television programs transmitted through an Internet network may be subject to many possible variations without departing from the novelty spirit of the inventive idea; it is also clear that in the practical implementation of the invention the illustrated details may have different shapes or be replaced with other technically equivalent elements.

For example, the method, apparatus and system for selecting and displaying, on or through a television signal receiver apparatus capable of connecting to Internet, television programs transmitted through an Internet network may provide for switching from the air or cable broadcast to the Internet transmission automatically or when one or more parameters characterizing the quality of the television signal (e.g. field intensity, signal-to-noise ratio, error rate) are below a preset threshold. This operation may be carried out by the central processor 5, which controls the automatic switching to the Internet network 10, by knowing the URL 21 from the advanced EPG 17 contained in the memory-type processing circuit 8. In this case, the user is not even required to manually control the television/Internet switching by pressing keys of the remote control device 13.

It can therefore be easily understood that the present invention is not limited to a method, an apparatus and a system for selecting and displaying television programs broadcast through Internet, but may be subject to many modifications, improvements or replacements of equivalent parts and elements without departing from the novelty spirit of the inventive idea, as clearly specified in the following claims.

While this invention has been described in conjunction with the specific embodiments outlined above, it is evident that many alternatives, modifications, and variations will be apparent to those skilled in the art. Accordingly, the preferred embodiments of the invention as set forth above are intended to be illustrative, not limiting. Various changes may be made without departing from the spirit and scope of the inventions as defined in the following claims.

The invention claimed is:

1. A method for selecting and displaying, on or through a television signal receiver apparatus configured to connect to an Internet network and to point to Uniform Resource Locators ("URLs"), television programs transmitted through the Internet network, said method comprising:
   receiving Electronic Program Guide ("EPG") data at the television signal receiver apparatus;
   storing the EPG data in a memory-type processing circuit of the television signal receiver apparatus such that the stored EPG data includes EPG data for television programs that were broadcast in the past, television programs that are presently being broadcast, and television programs that are scheduled to be broadcast in the future;
   converting the EPG data to advanced EPG data by:
      identifying a specific television program referenced in the EPG data;
      identifying a plurality of URLs, each URL in the plurality of URLs pointing to a corresponding video file that is streamable over the Internet network,
         wherein said video files each provide streamable content that was, is, or will be provided by the specific television program when the specific television program is broadcast, and
         wherein at least one URL included in the plurality of URLs refers to an Internet page not belonging to a site of a television network broadcasting the specific television program;
      associating the plurality of URLs with the specific television program;
      wherein said association includes storing said plurality of URLs in the memory-type processing circuit of the apparatus with the EPG data to create a link between said specific television program received through said Internet network and the same specific television program of said EPG data received by said apparatus via the television broadcast;

displaying at least some of the EPG data in an EPG user interface, said displaying including displaying specific EPG data corresponding to the specific television program; and in response to a user interface cursor being positioned over a user interface cell displaying the specific EPG data corresponding to the specific television program, displaying a superimposed screen that lists the plurality of URLs corresponding to the specific television program, wherein the superimposed screen partially, but not entirely, superimposes the user interface cell such that at least some of the specific EPG data and the plurality of URLs are displayed simultaneously with one another within the EPG user interface.

2. The method according to claim 1, further comprising:
allowing said specific television program to be selected and displayed via the television broadcast or through the Internet network.

3. The method according to claim 2, wherein said selection between the television broadcast and the Internet network is obtained by means of a command issued by a user of said apparatus through a dedicated key of a control device.

4. The method according to claim 1, further comprising:
displaying, on the EPG user interface, other EPG data corresponding to a plurality of other television programs.

5. The method according to claim 1, wherein a second URL included in the plurality of URLs refers to an external server that stores at least one of the video files.

6. The method according to claim 1, wherein said EPG data, which is received via the television broadcast, is processed and stored in said memory-type processing circuit, said EPG data includes data received for a certain period of time in the past.

7. The method according to claim 1, wherein a second URL included in the plurality of URLs is transmitted in a television signal, along with the EPG data, by the television network via the television broadcast, and is received by an input of said apparatus.

8. The method according to claim 1, wherein said storing of said EPG data is carried out under control of a central processor of said apparatus.

9. A television signal receiver apparatus adapted to select and display, on a screen internal or external to the apparatus, television programs transmitted through an Internet network, comprising:
at least one input configured to receive television signals;
a tuning and demodulating unit configured to tune and demodulate said television signals;
a video circuit configured to decode video of said television signals;
a switching circuit configured to supply to said screen signals of television programs received via a television broadcast over air or cable broadcast or received over the Internet network;
at least one network interface configured to connect to said Internet network and to point to Uniform Resource Locators ("URLs");
at least one memory-type processing circuit adapted to process and store Electronic Program Guide ("EPG") programming data, which are received along with said television signals irradiated via the television broadcast;
a central processor adapted to control the operation of the above-mentioned elements;
wherein said apparatus is adapted to:
identify a specific television program referenced in the EPG programming data;
identify a plurality of URLs, each URL in the plurality of URLs pointing to a corresponding video file that is streamable over the Internet network,
wherein said video files each provide streamable content that was, is, or will be provided by the specific television program when the specific television program is broadcast, and
wherein at least one URL included in the plurality of URLs refers to an Internet page not belonging to a site of a television network broadcasting the specific television program;
associate the plurality of URLs with the specific television program;
display at least some of the EPG programming data in an EPG user interface, said displaying including displaying specific EPG programming data corresponding to the specific television program; and
in response to a user interface cursor being positioned over a user interface cell displaying the specific EPG programming data corresponding to the specific television program, display a superimposed screen that lists the plurality of URLs corresponding to the specific television program, wherein the superimposed screen partially, but not entirely, superimposes the user interface cell such that at least some of the specific EPG programming data and the plurality of URLs are displayed simultaneously with one another within the EPG user interface.

10. The television signal receiver apparatus according to claim 9, wherein the central processor is further adapted to automatically switch from displaying the specific television program received over the air or cable broadcast to displaying the specific television program received over the Internet network when one or more parameters characterizing a quality of the television broadcast are below a preset threshold.

11. The television signal receiver apparatus according to claim 9, wherein said EPG programming data received via the television broadcast is processed by storing into said memory-type processing circuit not only data relating to said EPG programming data received instant by instant via the television broadcast but also data received for a certain period of time in the past.

12. The television signal receiver apparatus according to claim 9, wherein said at least one URL is stored in said memory-type processing circuit by said central processor of said apparatus.

13. The television signal receiver apparatus according to claim 9, further comprising:
a web decoder adapted to decode the video files when the video files are streamed to the apparatus.

14. The television signal receiver apparatus according to claim 9, wherein said central processor obtains a second URL relating to said specific television program by extracting the second URL from said EPG programming data received via the television broadcast.

15. The television signal receiver apparatus according to claim 9, further comprising:

an Internet browser circuit adapted to allow a user to search the Internet network for said specific television program by entering in a search engine data describing said specific television program so as to identify one or more URLs included in the plurality of URLs.

16. The television signal receiver apparatus according to claim 15, wherein searching for the one or more URLs is carried out automatically under control of said central processor.

17. A system comprising:
at least one television network broadcasting Electronic Program Guide ("EPG") data;
wherein the system is adapted to select and display, on or through a television signal receiver apparatus configured to connect to an Internet network and to point to Uniform Resource Locators ("URLs"), television programs transmitted through the Internet network;
wherein the system is further adapted to convert said EPG data to advanced EPG data by:
identifying a specific television program referenced in the EPG data;
identifying a plurality of URLs, each URL in the plurality of URLs pointing to a corresponding video file that is streamable over the Internet network,
wherein said video files each provide streamable content that was, is, or will be provided by the specific television program when the specific television program is broadcast, and
wherein at least one URL included in the plurality of URLs refers to an Internet page not belonging to a site of a television network broadcasting the specific television program;
associating the plurality of URLs with the specific television program;
wherein a central processor of the television signal receiver apparatus is adapted to automatically switch from displaying the specific television program received over air or cable broadcast to displaying the specific television program received over the Internet network when one or more parameters characterizing a quality of a television broadcast for the specific television program are below a preset threshold, and
wherein the system is further adapted to:
display at least some of the EPG data in an EPG user interface, said displaying including displaying specific EPG data corresponding to the specific television program; and
in response to a user interface cursor being positioned over a user interface cell displaying the specific EPG data corresponding to the specific television program, display a superimposed screen that lists the plurality of URLs corresponding to the specific television program, wherein the superimposed screen partially, but not entirely, superimposes the user interface cell such that at least some of the specific EPG data and the plurality of URLs are displayed simultaneously with one another within the EPG user interface.

18. A method for selecting and displaying, on or through a television signal receiver apparatus configured to connect to an Internet network and to point to Uniform Resource Locators ("URLs") and to connect to an air or cable broadcast, television programs transmitted through the Internet network or over the air or cable broadcast, said method comprising:
receiving Electronic Program Guide ("EPG") data at the television signal receiver apparatus;
storing the EPG data in a memory-type processing circuit of the television signal receiver apparatus such that the stored EPG data includes EPG data for television programs that were broadcast in the past, television programs that are presently being broadcast, and television programs that are scheduled to be broadcast in the future;
identifying a specific television program referenced in the EPG data;
identifying a plurality of URLs, each URL in the plurality of URLs pointing to a corresponding video file that is streamable over the Internet network,
wherein said video files each provide streamable content that was, is, or will be provided by the specific television program when the specific television program is broadcast, and
wherein at least one URL included in the plurality of URLs refers to an Internet page not belonging to a site of a television network broadcasting the specific television program;
associating the plurality of URLs with the specific television program;
displaying at least some of the EPG data in an EPG user interface, said displaying including displaying specific EPG data corresponding to the specific television program; and
in response to a user interface cursor being positioned over a user interface cell displaying the specific EPG data corresponding to the specific television program, displaying a superimposed screen that lists the plurality of URLs corresponding to the specific television program, wherein the superimposed screen partially, but not entirely, superimposes the user interface cell such that at least some of the specific EPG data and the plurality of URLs are displayed simultaneously with one another within the EPG user interface.

* * * * *